No. 861,434. PATENTED JULY 30, 1907.
T. J. CHATHAM & J. S. HOLLIDAY.
PNEUMATIC TIRE.
APPLICATION FILED APR. 16, 1907.
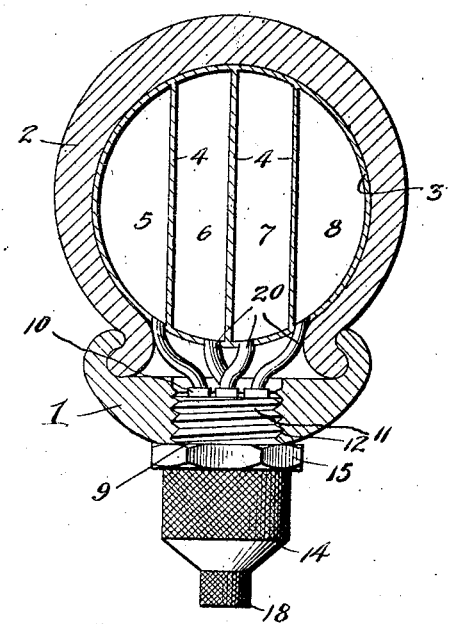
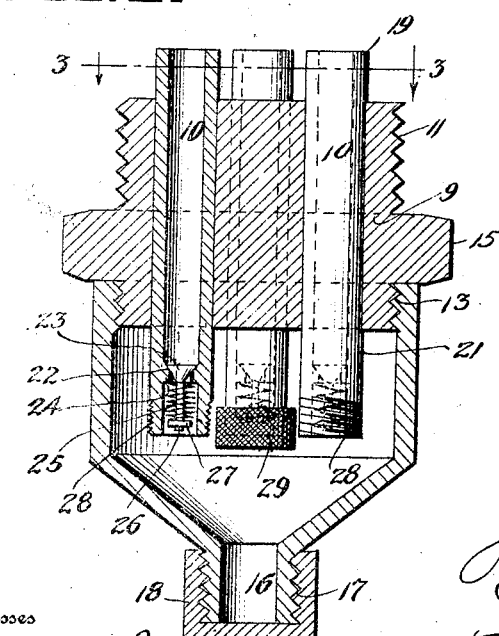
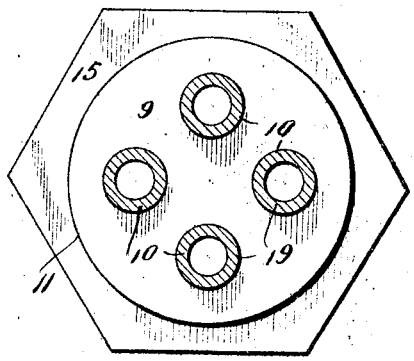
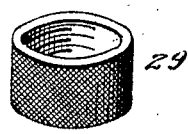

UNITED STATES PATENT OFFICE.

THOMAS J. CHATHAM AND JAMES S. HOLLIDAY, OF TURLOCK, CALIFORNIA.

PNEUMATIC TIRE.

No. 861,434.  Specification of Letters Patent.  Patented July 30, 1907.

Application filed April 16, 1907. Serial No. 368,468.

*To all whom it may concern:*

Be it known that we, THOMAS J. CHATHAM and JAMES S. HOLLIDAY, citizens of the United States, residing at Turlock, in the county of Stanislaus and State of California, have invented certain new and useful Improvements in Pneumatic Tires, of which the following is a specification, reference being had therein to the accompanying drawing.

Our invention relates to improvements in pneumatic tires of that class, which, when punctured, may be temporarily repaired without removing them from the wheel.

The object of the invention is to improve and simplify the construction and operation of tires of this character and thereby render the same less expensive and more durable and convenient in use.

With the above and other objects in view, the invention consists in the novel construction, combination and arrangement of parts hereinafter described and claimed, and illustrated in the accompanying drawings, in which Figure 1 is a cross sectional view through a wheel rim equipped with our improved pneumatic tire; Fig. 2 is a sectional view through the valve connection; Fig. 3 is a detail section taken on the plane indicated by the line 3—3 in Fig. 2; and Fig. 4 is a perspective view of one of the screw caps.

Referring to the drawings by numeral, 1 denotes a wheel rim and 2 an outer tire tube or casing. These parts may be of any desired form or construction and connected together in any suitable manner.

The numeral 3 denotes an inner tire constructed of elastic rubber and divided by a plurality of radially extending annular partitions 4 into a plurality of inner tubes 5, 6, 7, 8. These inner tubes are non-communicative and while they are preferably formed integral, they may be formed separate and independent. Any number of them may be provided and each one is capable of being expanded or inflated to fill the entire outer tube or casing 2.

The numeral 9 denotes a valve plug through which extend a plurality of valve tubes 10. The plug 9 is preferably formed with an externally screw threaded inner end 11 which is screwed into a threaded opening 12 formed in the rim 1, and a screw threaded outer end 13 for the reception of a removable casing 14 which forms a chamber that incloses the outer ends of the valve tubes 10. Upon the exterior of the plug 9 intermediate its threaded ends is formed a flange or enlargement 15 of hexagonal or other polygonal shape for the reception of a wrench or similar tool by means of which the plug may be applied to or removed from the rim. The casing 14 is formed at its outer end with a reduced portion 16 which is externally screw threaded, as shown at 17, for the reception of a pump connection and also for a screw cap 18 which serves to close said end of the casing and prevent the entrance of dust, water, and other foreign matter. Each of the tubes 10 has its inner end 19 projecting from the inner end of the plug 9 and suitably connected by a flexible tube 20 of rubber, or the like, to one of the inner tubes or compartments of the tire 3. The outer ends 21 of said tubes 10 project from the outer face of the plug and within them are arranged cone shaped valve seats 22 for engagement by cone valves 23. The seats 22 are formed in inwardly projecting annular flanges 24 provided in said tubes and said valves are retained normally upon their seats by coil springs 25 which surround outwardly projecting stems 26 upon said valves and are confined between the flanges or ribs 24 and collars 27 secured upon the outer ends of the stems 26. Owing to the construction and arrangement of these valves, it will be seen that the pressure within the tubes 10 will assist the springs 25 in closing the valves 23, and that when a pump is connected to the nipple 16 and operated, air will be forced into the casing 14 and the pressure will open the valves 23 so that the air can pass between the latter and their seats and through the tubes 10 and 20 to the inner tubes 5, 6, 7, 8. The projecting ends 21 of the tubes 10 are externally screw threaded, as at 28, for the reception of screw caps 29, as shown in Fig. 4. These caps 29 are only applied to the tubes 10 when the inner tubes to which the latter are connected have been punctured.

The operation of the invention will be readily understood from the foregoing description taken in connection with the drawings. It will be seen that by removing the cap 18 and attaching a pump to the nipple 16, all of the inner tubes 5, 6, 7, 8, may be simultaneously filled. When the cap 18 is applied, the outer ends of the tubes 10 containing the valves will be effectively protected from dirt, moisture, etc. Should one of the inner tubes 5, 6, 7, 8 become punctured it will collapse and the others may then be inflated so that the pressure in the tire may be maintained at a desired point. When a puncture occurs, the casing 14 is removed and one of the caps 29 applied to the tube 10 which communicates with the punctured inner tube of the tire. When this has been done, the casing 14 is replaced and a pump is connected to the nipple 16 and the other tubes inflated. The application of the cap 29 to the tube 10 prevents the air from passing through said tube and its inner tire tube and out through the puncture, as will be readily understood.

Having thus described our invention what we claim and desire to secure by Letters Patent is:—

The combination with a rim and an outer tire tube or casing, of a plurality of inner tire tubes, a plug screwed into said rim, a plurality of valve tubes extending through said plug, connections between the inner ends of said valve tubes and said inner tire tubes, a spring seated valve in each of said valve tubes, a casing screwed upon the outer end of said plug for inclosing the projecting outer ends of said valve tubes, said casing being formed with a threaded pump connection or nipple, a screw cap for closing the latter and screw caps for application to the projecting outer ends of the valve tubes, substantially as shown and for the purpose set forth.

In testimony whereof we hereunto affix our signatures in presence of two witnesses.

THOMAS J. CHATHAM.
JAMES S. HOLLIDAY.

Witnesses:
A. P. RIKER,
R. H. MOORE.